May 26, 1942.  C. D. JOHNSON  2,284,057
POT FOR USE IN HEAT TREATING BUNDLES OF WIRE
Filed Sept. 20, 1941
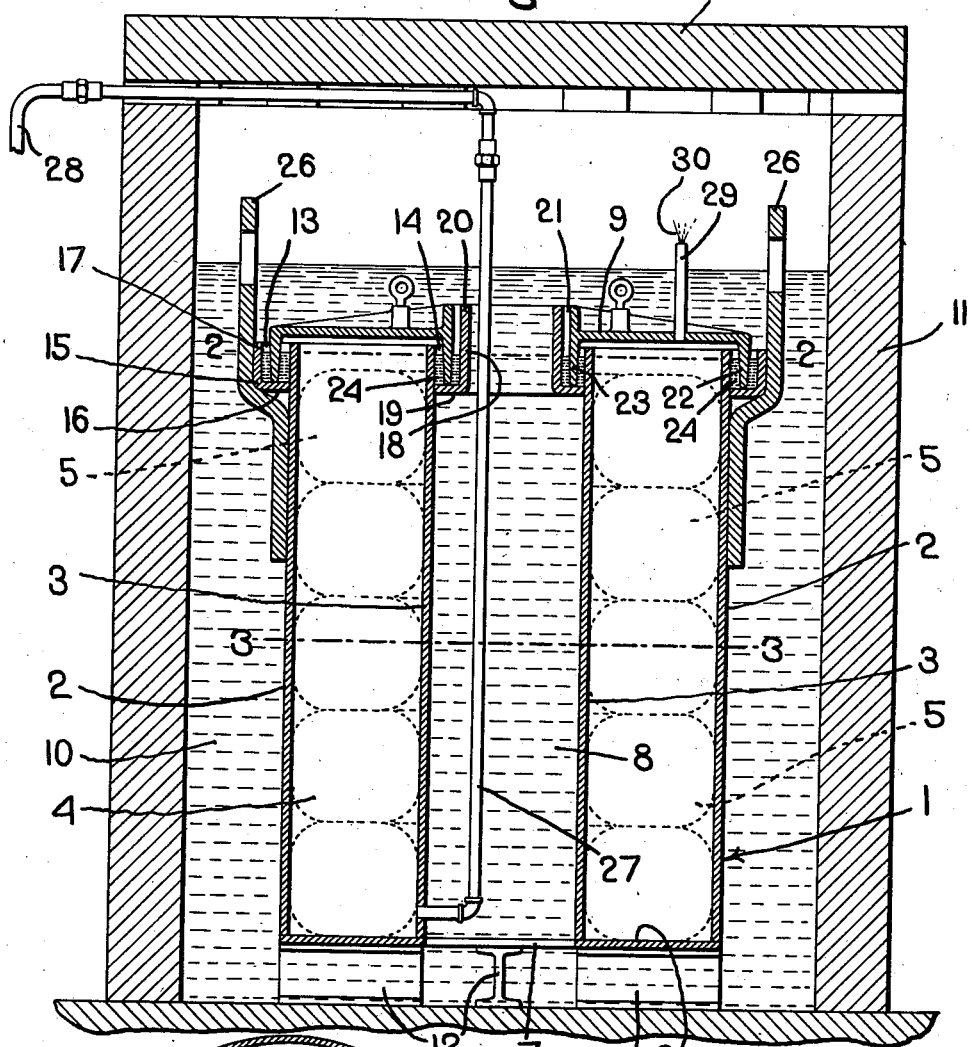
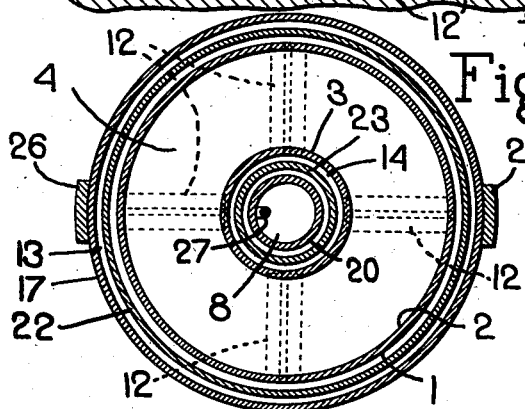
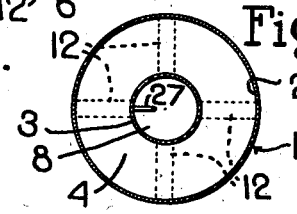
Inventor.
Charles D. Johnson
by Heard Smith & Tennant.
Attys.

Patented May 26, 1942

2,284,057

UNITED STATES PATENT OFFICE 2,284,057

POT FOR USE IN HEAT TREATING BUNDLES OF WIRE

Charles D. Johnson, Worcester, Mass., assignor to Johnson Steel and Wire Company, Inc., Worcester, Mass., a corporation of Massachusetts Application September 20, 1941, Serial No. 411,689

1 Claim. (Cl. 263—48)

This invention relates to a pot for use in heat treating bundles or coils of wire. These pots are usually made with inner and outer side walls forming between them an annular space in which the bundles or coils of wire to be heat treated are placed, and are provided with a cover to close the annular chamber during the heat treatment.

One way of heating the bundles of wire in the pot is to submerge the pot in a body of liquid contained in a tank or vat and which is heated to the proper temperature which sometimes is as high as 1600° F. the liquid used being of such a character that it will not evaporate appreciably at this high temperature.

Since the pot containing the bundles of wire is submerged in the liquid, it is necessary to provide means for sealing the joint between the cover and the side walls of the pot thereby to prevent any of the liquid from leaking into the chamber containing the wire and it is an object of my invention to provide a novel sealing means for this purpose which has such a construction that the mere act of placing the cover on the pot produces automatically the tight seal for the cover.

In order to give an understanding of the invention I have illustrated in the drawing a selected embodiment thereof which will now be described, after which the novel features will be pointed out in the claim.

In the drawing,

Fig. 1 is a vertical sectional view through a pot embodying my invention.

Fig. 2 is a section on a reduced scale on the line 2—2 Fig. 1.

Fig. 3 is a section on the line 3—3 Fig. 1.

In the drawing, the pot for containing the bundles of wire for the heat treatment is indicated generally at 1. This pot is formed with outer and inner side walls 2 and 3 forming between them an annular chamber 4 of a size to receive bundles or coils of wire which are indicated in dotted lines at 5. Each bundle or coil surrounds the inner wall 3, said wall extending through the center opening of the bundle.

The outer and inner side walls 2 and 3 are connected at their lower ends by the bottom member 6, the latter having an opening 7 therein registering with the space 8 enclosed by the inner wall 3.

The wire-receiving chamber 4 of the pot is closed during the heat treatment by a cover 9, the construction of which will be more fully described hereafter.

As stated above, the heat treatment of the bundles of wire enclosed in a pot of this type is sometimes effected by submerging the pot in a bath of some suitable liquid 10 that is contained in a vat or tank 11, means being provided for heating the liquid to sufficiently high temperature so that the wire may be heated to its critical temperature by heat transferred thereto through the walls of the pot from the heated liquid 10. For some purposes it may be necessary to heat the liquid to a temperature in the neighborhood of 1600° F. and it is, of course, understood that the liquid used for the bath 10 must be of such a character that it will not evaporate at the high temperature to which it is subjected. The pot 1 is shown as having legs or supports 12 which rest on the bottom of the tank 11 thereby providing a space between the bottom 6 of the pot and the bottom of the tank. When the pot 1 is submerged in the liquid 10, liquid will fill the chamber 8 enclosed by the inner wall 3 and thus the heat of the liquid is transferred to the wire through both the inner and the outer walls of the pot.

The construction thus far described is such as is commonly found in pots of this type and forms no part of my present invention which relates especially to the means for sealing the joint between the cover 9 and the pot 1.

My improved pot is provided at its upper end with two annular, open-topped sealing grooves 13 and 14. The annular sealing groove 13 is at the upper end of the outer side wall 2 and the annular sealing groove 14 is at the upper end of the inner side wall 3. In the preferred embodiment of my invention, the outer annular sealing groove 13 is situated on the outside of the outer side wall 2 and the inner annular sealing groove 14 is situated on the inside of the inner side wall 3.

The outer annular sealing groove 13 may conveniently be formed by securing an annular L-shaped ring 15 to the outside of the outer side wall 2, the horizontal leg 16 of said ring constituting the bottom of the groove and the vertical leg 17 thereof constituting the outer side wall of the groove.

Similarly, the inner annular sealing groove 14 may be formed by securing to the inner face of the inner side wall 3, an L-shaped ring 18 the horizontal leg 19 of which forms the bottom of the groove 14 and the vertical leg 20 of which forms the inner side wall thereof.

In the present embodiment, the cover 9 is provided with a central opening 21 and the vertical leg 20 of the ring 18 has a sufficient vertical dimension to extend through the opening 21.

The cover 9 is formed on its under side with two annular depending flanges 22 and 23 which are adapted to be received in the sealing grooves 13 and 14 when the cover is in a closed position. Each sealing groove contains a sealing material 24 which is in liquid form during the heat treatment. Lead makes an efficient sealing material although any material which will be liquid at the temperature existing in the tank 11 and which has sufficient specific gravity to constitute a seal may be used.

The sealing grooves 13 and 14 have a sufficient depth and the sealing material 24 has sufficient specific gravity so that the sealing material will not be forced out of the grooves by any difference in pressure which may exist on the portion of the sealing material outside of each flange and that inside each flange.

This manner of sealing the cover 9 does not require the use of any clamps or other mechanical means for forming a tight joint between the cover and the pot. With my invention the proper sealing of the joint is secured by merely placing the cover on the pot. Similarly, when the pot is removed from the tank after the completion of the heat treatment, the pot can be opened by merely lifting the cover 9. The vat 11 is shown as having a removable cover 25 and the pot is illustrated as having ears 26 rising from its upper end by which it can be lifted out of the tank after the heat treatment.

For some purposes it is desirable that the heat treatment of the wire should be carried out in a non-oxidizing atmosphere and to provide for this, I have shown means for delivering a non-oxidizing gas to the chamber 4 while the pot is submerged in the liquid 10.

The inner side wall 3 of the pot has a pipe 27 connected thereto which pipe extends up through the central chamber 8 and is connected to a flexible hose 28 leading to a source of gas supply. The cover 9 is shown as having a discharge pipe 29 extending therefrom which is of sufficient length so that the upper end thereof is located above the level of the liquid 10 when the pot is in the tank 11. During the heat treatment some suitable non-oxidizing gas is delivered to the chamber 4 through the pipe 27 and in order to insure that air will be excluded from the chamber 4 a supply of the gas is continually delivered to the chamber 4 through the pipe 27, said gas filling the chamber 4 and being discharged through the pipe 29. If the gas is of a combustible nature, the gas discharged from the pipe 29 is ignited, thereby producing a flame 30.

I claim:

A pot for use in heat treating wire, said pot comprising a body portion presenting inner and outer side walls forming between them an annular chamber to receive bundles of wire and a bottom member connecting said side walls, the space enclosed by the inner side wall being open at both top and bottom, said body portion having two annular open-topped sealing grooves at its upper end, one groove associated with the inner side wall and the other groove associated with the outer side wall, a cover for the pot body having two depending sealing flanges, one adapted to occupy the outer sealing groove and the other adapted to occupy the inner sealing groove, and sealing material in each groove in which the sealing flanges are partially submerged.

CHARLES D. JOHNSON.